6953X
J. B. Francis,
Boring Hubs.
Patented Mar. 2 1832.
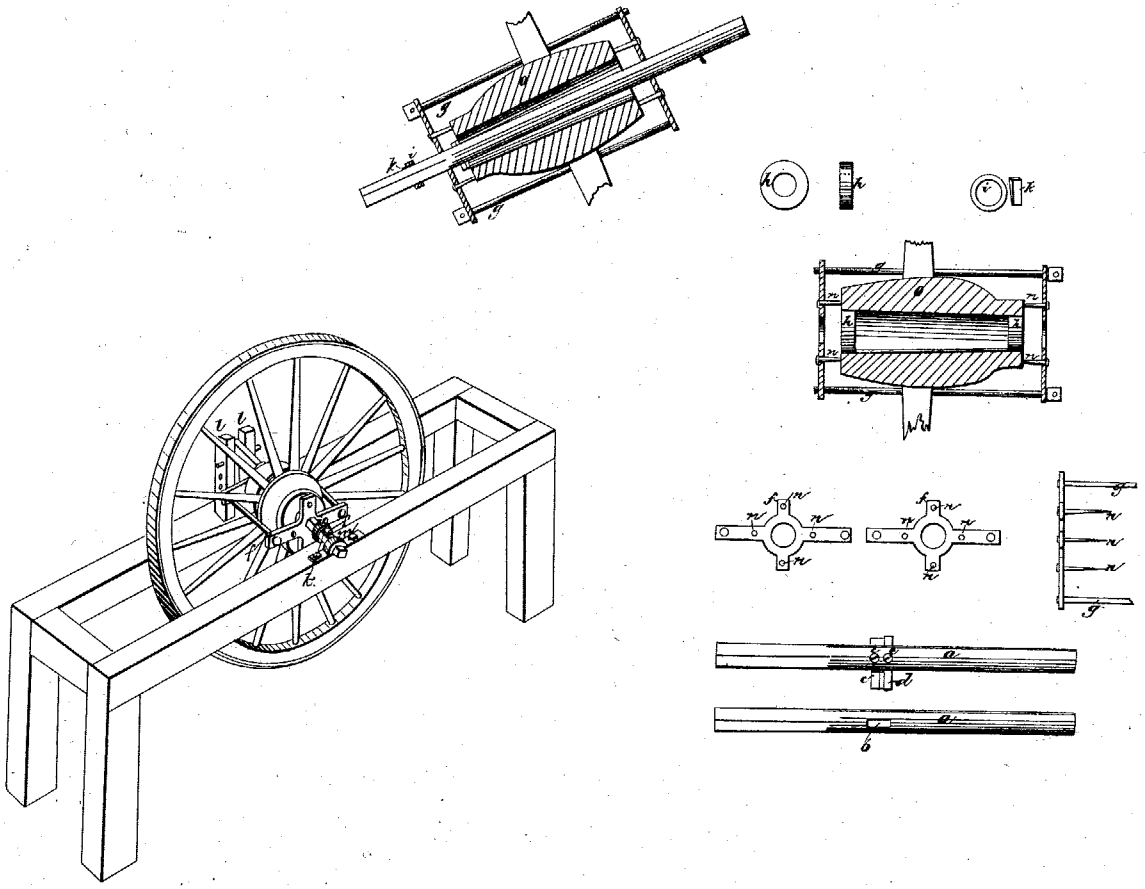
AM. PHOTO-LITHO. CO. N.Y. (OSBORNE'S PROCESS)

6953X Mar. 2. 1832 [illegible]

John B. Francis, Loudon County Virginia,

Letters Patent.

The Schedule referred to in these Letters Patent and making part of the same, containing a description in the words of the said John B. Francis, himself of his improvement in the machine for boring or cutting out the ends of Hubs of wheel carriages to receive the boxes.

To all to whom these presents shall come.—
Be it known that I John B. Francis in the County of Loudon and State of Virginia, have invented a new and useful improvement in cutting or boring out the hubs of waggons and all other wheel carriages to receive the boxes, also the cups for the Linch-pins. and the following is a full and exact description of the construction & operation of the said Machine as invented or improved by me according to the model herewith presented. First. an iron spindle about two feet six or eight inches long made round and smooth of uniform size, and large enough to prevent it from trembling, with one end square and a mortise about two inches long a foot at least from the square end to receive the shanks of the bits and gauge, with a tapering screw or wedge inserted crosswise of the shanks aforesaid, to tighten or slacken them. Bits of several sizes to suit the different sizes of boxes will be necessary, with shanks to fit the mortise in the spindle, leaving room between it and the [illegible] screw or wedge to receive the shank of the gauge. The blade of the bit should stand backward to throw the edge with the inner corner forward to prevent splintering or roughness in cutting. The Gauge should be made to pass before the edge of the bit bearing on the neck or shoulder so as to give the bit its proper depth or prevent it from taking too much wood. In the next place must be made two plates of iron with four wings, each two short ones opposite each other

[illegible]

those of one plate to suit the large end, and those of the other
the smaller end of the Hubs, also two longer wings to each plate
opposite each other, about one and a half inches longer (from the centre
of the plate) than the semi diameter of the largest Hubs, with a
point of iron three inches in length either riveted or screwed into
each wing at equal distances from the centre, also half inch
holes made near the extremeties of the long wings with [illegible]
cut in two of them, Two iron rods must be made to fit the
said holes with long screws cut on one end of them the
other end with a head and hole through it to receive a [illegible]
to turn them; the rods should be about twenty one inches long,
the plates must have holes in their centres to admit the spindle
the tighter the better, so that it can be inserted or drawn out with
ease. There is another Gauge necessary which is a band of iron
made to fit the spindle with substance sufficient to admit a
wedge or key to tighten and hold it stationary; it will also be
necessary for all persons using said Machine, to provide
wooden wheels (which I shall denominate centre wheels)
made to fit the spindle, and the inside of different sized
boxes. The manner of using said Machine is as follows;
The Hub must be gouged out in the usual way to the inside
of the boxes, then the centre wheels introduced into each end
and the spindle passed through them, the plates to be slipped
on the spindle at their respective ends, the long screws to be
inserted into their places in the wings with the rods passing between
the spokes of the wheel; the points are then entered into the
ends of the Hub and the screws wrenched up to hold them
to their places; the spindle is then drawn out and the centre
wheels taken out, the spindle is then returned and the bit
and first mentioned Gauge placed in the mortice and made
tight with the tapered screw or wedge, the spindle is run
through the Hub until stopped by the bit, the other gauge
is then slipped on the spindle and so far that the box for

64534 for which it is to be bored will fit in depth wise between the plate and Gauge, the Gauge is then made fast with its wedge) the wheel is to rest on the spindle, which is placed with the ends on two uprights or a frame made for the purpose with the squared end about eight or nine inches lower than the other, A cap or burr is slipped on the square end and screwed fast to the frame or upright which holds the spindle from turning. The wheel is then turned briskly round with the plates and long screw rods, with the weight in their inclined position bearing against the bit and gauge until the plate comes down to the circular Gauge the operation is then completed. / ×

The spindle is then drawn out the wheel is turned round presenting the other end of the hub the spindle returned a suitable bit introduced and the operation performed as before the cup for the Linch-pin is bored out in like manner. The whole operation is performed with the greatest facility and accuracy; it is believed that the whole operation of boring the hubs and then wedging in a set of boxes. will not occupy more than two hours by one person, whereas by the usual process, it is considered by wheel wrights to be a full days work, and in point of accuracy and solidity, this Machine will be far preferable, as it cuts smooth in the most [illegible] or [illegible] grained wood.

Witnesses
Wm. B. Francis
Thom. [illegible] Rees

John B. Francis

[illegible] [illegible]

1032 [illegible]